United States Patent [19]
Zupanick

[11] 3,867,994
[45] Feb. 25, 1975

[54] SURFACE EFFECT VEHICLE CONTROL SYSTEM

[75] Inventor: Joseph E. Zupanick, Richardson, Tex.

[73] Assignee: Sun Oil Company, Dallas, Tex.

[22] Filed: Sept. 10, 1973

[21] Appl. No.: 395,670

[52] U.S. Cl. .............................................. 180/118
[51] Int. Cl. ............................................... B60v 1/04
[58] Field of Search ........... 180/117, 116, 118, 120, 180/121, 122; 244/53 B; 137/15.2; 416/42

[56] References Cited
UNITED STATES PATENTS

| | | | |
|---|---|---|---|
| 3,067,578 | 12/1962 | Goodall et al................. | 244/53 B X |
| 3,302,657 | 2/1967 | Bullock ............................ | 244/53 B |
| 3,386,524 | 6/1968 | Tiedemann ........................ | 180/117 |
| 3,425,505 | 2/1969 | Jones .................................. | 180/118 |
| 3,590,939 | 7/1971 | Grihangne ......................... | 180/118 |
| 3,648,799 | 3/1972 | Young et al. ....................... | 180/121 |

FOREIGN PATENTS OR APPLICATIONS 980,570   1/1965   Great Britain ..................... 180/117

Primary Examiner—Kenneth H. Betts
Attorney, Agent, or Firm—George L. Church; Donald R. Johnson; John E. Holder

[57] ABSTRACT

This disclosure relates to controlling a surface effect vehicle. Pressure transducers sense the air pressures at the output of the vehicle's blower fan and in the vehicle's plenum chamber. An analog summer generates a signal indicative of a relationship between the two pressures and the signal controls a first servo mechanism which regulates the volume air which enters the blower fan. The control system automatically maintains a constant pressure in the plenum chamber, which prevents vehicle oscillation in the vertical and other modes, thereby eliminating instabilities. In addition a second servo mechanism operates in conjunction with the first servo mechanism system to allow control by manual command.

14 Claims, 2 Drawing Figures

SURFACE EFFECT VEHICLE CONTROL SYSTEM

BACKGROUND OF THE INVENTION

This invention pertains to controlling surface effect vehicles, and more particularly to stabilizing such vehicles by regulating the volume of air that enters the vehicle's blower fan.

The surface effect principle is currently being considered as a motive mechanism in many vehicle applications. A particularly useful application is in vehicles for use in areas of rugged terrain inaccessible to the current mode of travel. One such area is the ice-bound Arctic, which holds much needed mineral resources, including petroleum.

To reach the Arctic mineral producing areas, some have attempted to use water transportation, but it is limited to the summer months unless slow and expensive ice breakers are employed. Air transportation is another currently used method but it suffers from inadequate cargo capacity and concomitant expense. A third method is the wheeled vehicle but it is useful only on land or on continuous expanses of ice unbroken by open water. Where it can be used, roads must be cleared over the irregular icy terrain and must be continually maintained due to shifting and build-up of the ice masses. An obvious solution to these problems is a vehicle employing the surface effect, generally known as a surface effect or air cushion vehicle, which can travel over both irregular terrain and open water and transport heavy loads. Savings in resources and time are apparent. In addition, for overland use their distribution of vehicle weight over an area much larger than a wheel in a conventional wheeled vehicle alleviates damage to delicate terrain such as the Arctic tundra.

Surface effect vehicles are not free of difficulties, however. A major problem is instability caused by the physical characteristics of the air cushion system. Generally a surface effect vehicle comprises a platform, an air blower system, and an air cavity, or plenum, surrounded by a flexible skirt under the platform. The blower forces air from the atmosphere into the plenum, and the plenum pressure increases until it provides an upward force that exceeds the vehicle's weight. When this condition occurs, the vehicle lifts off from the surface of the earth and becomes airborne. When airborne, the instabilities begin to occur. The instabilities are of two types, both related to the relationship between the quantity of air supplied by the blower system to the plenum and the pressure at which the air is supplied. A simple blower system, which comprises a fan driven by a motor, supplies at a given fan RPM an output air pressure that initially increases as the quantity of output air increases until a peak is reached. This is hereinafter called the increasing portion of the pressure-quantity characteristic. Thereafter the output pressure decreases as the quantity of output air increases. This is hereinafter called the decreasing portion of the characteristic. The same relationship occurs for all values of motor RPM to form a family of similar pressure-quantity characteristic curves. The first type of instability occurs on the portion of the pressure quantity characteristic where pressure increases with an increasing quantity of air. On this portion, if plenum pressure suddenly decreases as when the vehicle traverses an indentation in the earth's surface thereby effectively increasing the plenum volume, the quantity of air produced by the blower will decrease. This will further lower the pressure and the cycle will continue until the vehicle settles to the surface. If the plenum pressure increases, as when the vehicle traverses a raised portion of the earth surface thereby decreasing the volume of the plenum, the plenum pressure will increase, which in turn causes the quantity of air supplied by the fan to increase. The increased air supply causes a further pressure increase. This will continue and the vehicle will rise until the pressure quantity peak is reached. When the vehicle is operating at the peak of the pressure quantity curve any perturbation of either pressure or air quantity will cause the vehicle to either return to the increasing portion of the characteristic with the above discussed results or enter the decreasing portion.

The second type of instability occurs in the decreasing portion of the characteristic. If pressure increases while the vehicle is operating in that portion, the quantity of air produced by the blower decreases. This causes the pressure to decrease, which in turn causes the quantity of air to increase. A converse process occurs when the pressure initially decreases. The blower system will thus oscillate causing the vehicle itself to oscillate in the upward and downward and possibly other modes, much like a spring-mass system. Such oscillations may reach as high as two cycles per second.

The undesirability of the first type of instability resides in its preventing the vehicle from remaining airborne. The second type causes both wear, tear and fatique to the skirt due to its repeated contact with the surface and fuel waste due to a constantly varying load on the blower motor. Since it is desirable to operate near the peak of the pressure-quantity characteristic for reasons of fuel efficiency, both instabilities are likely to occur and must be guarded against.

Several different methods have been attempted to solve this instability problem. Some have varied the RPM of the blower fan usually under the manual control of an operator, but this suffers from inefficient motor operation, loss of lift and delayed response to the oscillations, which in some cases aggravates the condition. Another method appears in Canadian Pat. No. 847,722, which uses a plenum chamber pressure-activated control system to vary the pitch of blades on the blower fan. However, this requires the use of a complicated, expensive and difficult-to-maintain mechanical fan blade pitch system. It also fails to take into account response time required for compensating pressure supplied by the fan to communicate with the plenum chamber. It is therefore desirable to find a control system that is mechanically simple, that maintains a contast lift capability and that responds quickly to the relatively rapid vehicle oscillations.

It is therefore an object of this invention to provide a surface effect vehicle stabilizer system having improved operating characteristics.

SUMMARY OF THE INVENTION

With this and other objects in view, this invention contemplates a surface effect vehicle control system capable of stabilizing the vehicle. Air is moved by means of fans or the like into a plenum for containing air under the vehicle to thereby support the vehicle in a hovering mode. Instability of the hovering attitude is detected by means of sensors and an air regulator operates in response to the sensors to control the amount of air that enters the fans. This system thereby controls the flow of air to the underside of the vehicle, thus stabilizing the vehicle.

DESCRIPTION OF THE PREFERRED EMBODIMENTS

Figure 1:
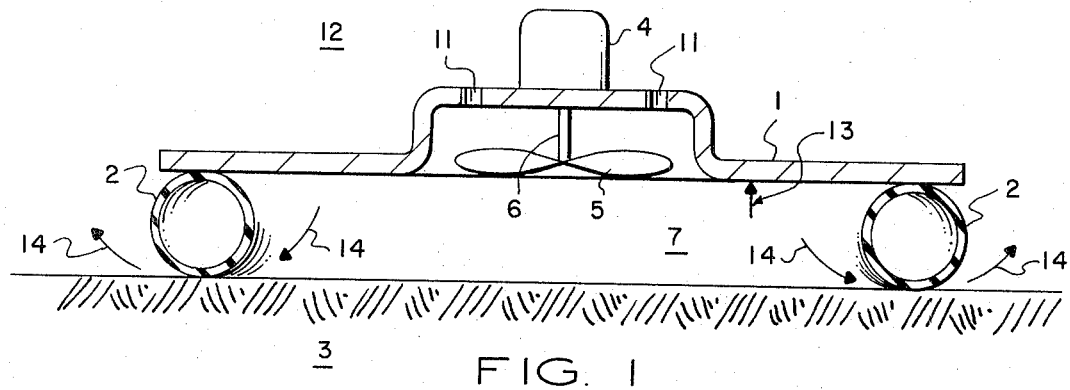
FIG. 1 shows a surface effect vehicle in simplified form in which the control system might be used.

FIG. 1 shows a surface effect vehicle in a much simplified form having a platform 1 around whose periphery is attached a flexible, inflatable skirt 2. The vehicle rests on the surface 3. Attached to the platform 1 is a motor 4 which drives an air blower fan 5 through a shaft 6. Although only one blower fan is shown, a typical vehicle would contain a member of fans. The platform 1 and the skirt 2 combine to form an air concavity, or plenum chamber, 7 for containing air under the vehicle. The platform 1 contains openings 11 which allow air to communicate between the atmosphere 12 and the plenum chamber 7.

In operation the motor 4 drives fan, or blower, 5 which draws air from atmosphere 12 through openings 11 into plenum chamber 7. The increased volume of air in plenum chamber 7 causes the pressure therein to rise. After the pressure in plenum chamber 7 has risen to the point that it exerts an upward force 13 equal to the weight of the surface effect vehicle, the vehicle will rise from the surface 3. Air will thus escape from the plenum chamber 7 from between the skirt 2 and the surface 3 as indicated by arrows 14. The vehicle will continue to rise until the volume of escaping air 14 becomes sufficiently large that the pressure in plenum chamber 7 can rise no further. The upward force 13 will thus be at a point where it will maintain the surface effect vehicle at a particular altitude in an equilibrium position. When it is necessary to land the vehicle the motor 4 is slowed, and less air is thus drawn from the atmosphere 12 into the plenum chamber 7. The pressure in plenum chamber 7 will thus fall, and the upward force 13 will decrease until it is no longer able to support the weight of the vehicle. The vehicle will then settle to the surface.

Figure 2:
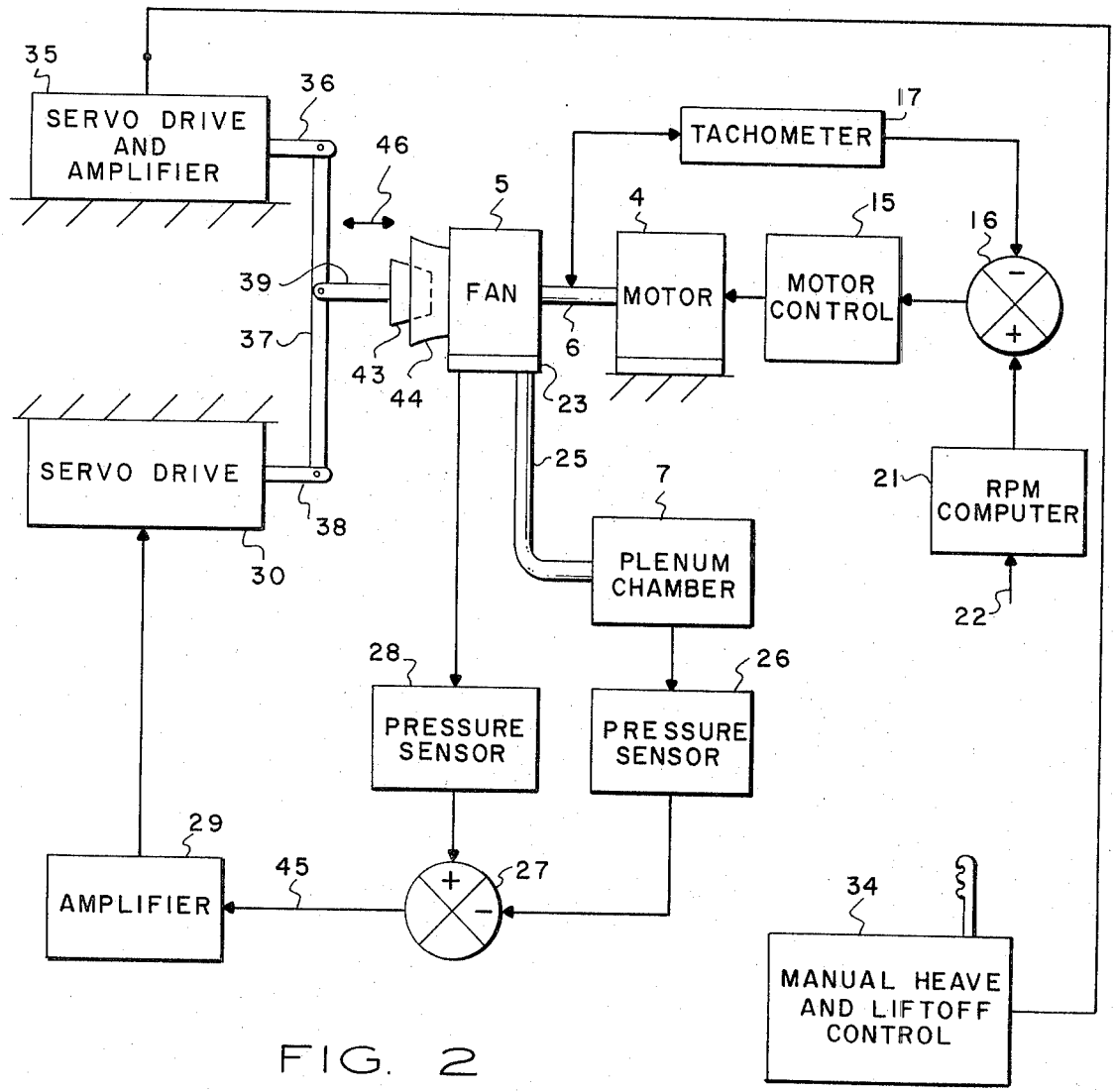
FIG. 2 is a schematic diagram of the control system, which may be used with the surface effect vehicle shown in FIG. 1.

Referring to FIG. 2, a motor 4 is connected to a fan 5 by a shaft 6. The motor 4 is operated by a motor control 15, which is connected to a summer 16. Connected to one input of the summer 16 is an RPM tachometer 17 which is operatively connected to shaft 6. A second input of the summer 16 is an RPM computer 21. The RPM computer 21 is disposed to accept a system weight input 22.

Fan 5 has an air outlet 23 which is connected to the surface effect vehicle plenum chamber 24 by an air communicating means or duct, 25. Although only one motor 5 and air communicating means 25 is shown a number of such fans and air transmission means may be used. In communication with the plenum chamber 24 is a first pressure sensor, 26 or transducer which is itself connected to a summer 27. These sensors act as instability detectors. Also connected to summer 27 is a second pressure sensor 28 which is in communication with air outlet 23 of fan 5. Summer 27 is also connected to an amplifier 29 which is connected to a first servo drive 30. The control loop comprising sensors 26 and 28, summer 27, amplifier 29 and servo drive 30 may be electrical, pneumatic, or the like.

A manual heave and liftoff control 34 is connected to a second servo drive 35. A servo actuator 36 of servo drive 35 is pivotally connected to a summing bar 37 on one end. The other end of bar 37 is pivotally connected to a servo actuator 38 of servo drive 30. A connector 30 attached pivotally to the center of bar 37 is connected to an air regulator 43 to transmit motion to the regulator. The regulator is supported within air inlet 44 of fan 5.

In operation the motor 4 and the fan 5 are started, and the motor accelerates to a predetermined RPM. A motor RPM is selected that will cause fan 5 to supply a sufficient volume of air to plenum chamber 24 to overcome the weight of the vehicle and support it in an airborne state. A signal 22 which is proportional to the weight of the surface effect vehicle is inputed into the system RPM computer 21. RPM computer 21 supplies a control signal to summer 16 which in turn supplies a signal to motor controller 15 which controls motor 4. The output of motor 4 is measured by RPM tachometer 17 which supplies a feedback signal to summer 16. The speed of motor 4 is thus accurately controlled at the predetermined level.

After the motor has reached operating speed the operator actuates manual heave and liftoff control 34 which causes manual servo drive 35 to remove air regulator 43 from air inlet 44 of fan 5. By manipulating manual heave and liftoff control 34 the operator can thus control the volume of air that enters air inlet 44. Air will flow from fan 5 through air transmission means 25 into plenum chamber 24 and the vehicle will liftoff the surface and become airborne as described above in relation to FIG. 1.

When the surface effect vehicle is airborne, pressure sensors 26 and 28 measure the air pressure in plenum chamber 24 and at the air outlet 23 of fan 5. Summer 27 receives signals from pressure sensors 26 and 28 and generates an error signal 45 which is amplified by amplifier 29 and transmitted to servo drive 30. The first servo drive 30 causes air regulator 43 to move in and out of air inlet 44 of fan 5 as indicated by arrow 46. The movement of air regulator 43 is dependent upon the difference between the air pressure in plenum 24 and out air outlet 23 of fan 5. The effect of the operation of the system is to maintain a constant air pressure in plenum 24. If pressure sensor 28 senses a higher pressure than in pressure sensor 26, stabilizer servo drive 30 will cause air regulator 43 to begin to close air inlet 44. This will cause fan 5 to produce a smaller volume of air at air outlet 23 and thereby reduce the pressure sensed by pressure transducer 28. Air regulator 43 will continue to move inward until the pressure sensed by pressure sensors 28 and 26 are equal. If the pressure sensed by pressure sensor 28 is less than that sensed by pressure sensor 26, servo drive 30 will cause air regulator 43 move out of air inlet 44 of fan 5. This will cause fan 5 to produce a larger amount of air at air outlet 23. Air regulator 43 will continue to open air inlet 44 until pressure sensors 26 and 28 sense the same pressure level. By maintaining a constant pressure in plenum 24, the surface effect vehicle is maintained at a constant altitude and instabilities in the vertical and other modes are eliminated.

While particular embodiments of the present invention have been shown and described, it is apparent that changes and modifications may be made without departing from this invention in its broader aspects, and therefore the aim in the appended claims is to cover all such changes and modifications that fall within the true spirit and scope of this invention.

What is claimed is:

1. A surface effect vehicle control system which comprises: means for blowing air; means connected to the air blowing means for communicating air; means connected to the air communicating means for containing air on the underside of the vehicle; first pressure sensing means in the air containing means; second pressure sensing means in the air blowing means; and means for regulating the amount of air entering the air blowing means in response to the first and second pressure sensing means.

2. A surface effect vehicle stabilizer system, which comprises: an air blower; a concavity on the underside of the vehicle; means for communicating air between the air blower and the concavity; a first pressure sensor at the exit of the air blower; a second pressure sensor in the concavity; means for generating a signal indicative of a relationship between the pressures sensed by the first and second pressure sensors; an air flow regulator in the inlet of the air blower; and means for controlling the air flow regulator in response to the signal generated by the signal generating means.

3. The system of claim 2 which includes means for controlling the air flow regulator in response to a manual command.

4. The system of claim 2 wherein the signal generating means is a summer.

5. The system of claim 2 wherein the means for controlling the air flow regulator comprises a servo drive and a motion transmitter that operatively connects the servo drive and the air flow regulator.

6. The system of claim 5 which includes means for controlling the air flow regulator in response to a manual command.

7. The system of claim 6 wherein the means for controlling the air flow regulator in response to a manual command comprises: a manual control; a second servo drive in communication with the manual control; and a motion transmitter that operatively connects the second servo drive and the air flow regulator.

8. A surface effect vehicle altitude control system, which comprises: an air blower; a plenum chamber in communication with the air blower; a first pressure sensor in the air blower; a second pressure sensor in the plenum chamber; means for generating a signal indicative of a relationship between the pressures sensed by the first and second pressure sensors; an air flow regulator in the inlet of the air blower; first means for controlling the air flow regulator in response to the signal generated by the signal generating means; and second means for controlling the air flow regulator in response to a manual command.

9. The system of claim 8 wherein the first and second pressure sensors are transducers.

10. The system of claim 9 wherein the signal generating means is a summer.

11. The system of claim 10 wherein the first means for controlling the air flow regulator comprises a first servo drive and a motion transmitter that operatively connects the servo drive and the air flow regulator.

12. The system of claim 11 wherein the second means for controlling the air flow regulator comprises: a manual control; a second servo drive in communication with the manual control; and a motion transmitter that operatively connects the second servo drive and the air flow regulator.

13. A stabilizer system for a surface effect vehicle that includes an air blower and a plenum chamber in communication therewith, which comprises: a first pressure transducer in the air blower; a second pressure transducer in the plenum chamber; an analog summer connected to the first and second pressure transducers; an amplifier connected to the analog summer; a servo drive connected to the amplifier; an air flow regulator in the inlet of the air blower; a motion transmitter between the servo drive and the air flow regulator.

14. A method of stabilizing a surface effect vehicle having an air blower which supplies air to a plenum chamber, comprising the steps of: sensing the air pressure at the air blower; sensing the air pressure in the plenum chamber; comparing the pressures sensed at the air blower and in the plenum chamber; generating a signal indicative of the comparative relationship between the two sensed pressures; and regulating the amount of air that enters the air blower in response to the generated signal.

* * * * *